Nov. 28, 1950 M. CAWEIN ET AL 2,531,398

INTERFERENCE TRANSMISSION SYSTEM

Filed Feb. 25, 1943 3 Sheets-Sheet 1

INVENTORS
MADISON CAWEIN
JOSEPH D. SCHANTZ

BY [signature]

ATTORNEY

INTERFERENCE TRANSMISSION SYSTEM

Filed Feb. 25, 1943 3 Sheets-Sheet 2

INVENTORS
MADISON CAWEIN
JOSEPH D. SCHANTZ
BY [signature]
ATTORNEY

INTERFERENCE TRANSMISSION SYSTEM

Filed Feb. 25, 1943 3 Sheets-Sheet 3

INVENTORS
MADISON CAWEIN
JOSEPH D. SCHANTZ
BY [signature]
ATTORNEY

Patented Nov. 28, 1950 2,531,398

UNITED STATES PATENT OFFICE 2,531,398

INTERFERENCE TRANSMISSION SYSTEM

Madison Cawein and Joseph D. Schantz, Fort Wayne, Ind., assignors, by mesne assignments, to Farnsworth Research Corporation, a corporation of Indiana Application February 25, 1943, Serial No. 477,047

14 Claims. (Cl. 250—17)

This invention relates to radio transmitting systems and particularly to the transmission of interference effects to prevent the intelligible reception of signals transmitted on a selected communication channel.

According to conventional practice, radio communications have been disrupted by so called "jamming" methods. Usually this method is carried out by radiating at a substantial power level some type of noise current. This type of interference is effectively achieved by transmitting energy which is rich in harmonics of the fundamental frequency. In this way a substantial portion of the frequency spectrum is effectively covered so that all communications at power levels not exceeding the level of the interference are rendered unintelligible.

As is well understood, numerous operations in modern warfare are dependent in large part for their success upon communications between the various units taking part and a central point from which the operation is being directed. Where the operation involves a number of land tanks or where it is a naval operation involving a number of widely separated surface and subsurface vessels, the communications must of necessity be radio communications. It is apparent that a great advantage lies with the side which can disrupt the enemy's communications in an operation of this type.

However, those desiring to disrupt an enemy's radio communications must do so in a way to maintain their own intact. Obviously the prior art methods of disrupting communications are not suitable for such a situation for the reason that all communications of both sides would be disrupted. Consequently, it is desirable to have available apparatus which can be used to determine quickly the frequency of the enemy's channel and then be so adjusted as to transmit interference effects that are confined to a relatively small portion of the frequency spectrum, including the predetermined channel of communication used by the enemy. At the same time it is desirable that the interference be of such a character that the communication which is subjected to the interference have the semblance of being a translatable communication but that actually it be completely unintelligible.

An object of the present invention, therefore, is to provide a system for transmitting radio interference effects which will effectively multilate the intelligence signals of a selected communication channel so as to render them unintelligible to the intended receiver.

Another object of the invention is to provide a novel interference transmitter by which there is effected, at a syllabic and predetermined code rate, an abrupt frequency modulation of a carrier wave within a selected relatively narrow band which includes the carrier wave of the communication to be disrupted.

A further object of the invention is the provision of a method of disrupting any desired radio communication by transmitting a carrier wave which is abruptly modulated in frequency in a band which includes the carrier wave of the communication to be disrupted, and in an apparently random manner.

In accordance with the present invention there is provided a system including a radio receiving device by which there may be determined the carrier wave frequency of the signals to be mutilated by interference. Also included is a transmitter for transmitting an interfering carrier wave. The interfering carrier wave is abruptly frequency-modulated in a band which includes the signal frequency. The modulation is effected in an apparently random manner and substantially at a syllabic speech rate. The determination of the signal frequency may be expedited by the use of a panoramic type of receiver employing a visual indicating device. In this case a number of signals may be examined simultaneously. The visual indicating device also may be employed to facilitate the adjustment of the transmitter to the proper frequency. The transmitter output circuits are designed to effect the optimum coupling to a particular antenna system. In order to secure efficient operation with other antenna systems at all frequencies, there is provided means for varying the effective coupling between the transmitter output circuits and the antenna system.

For a better understanding of the invention, together with other and further objects thereof, reference is had to the following description, taken in connection with the accompanying drawings, and its scope will be pointed out in the appended claims.

Figure 1:
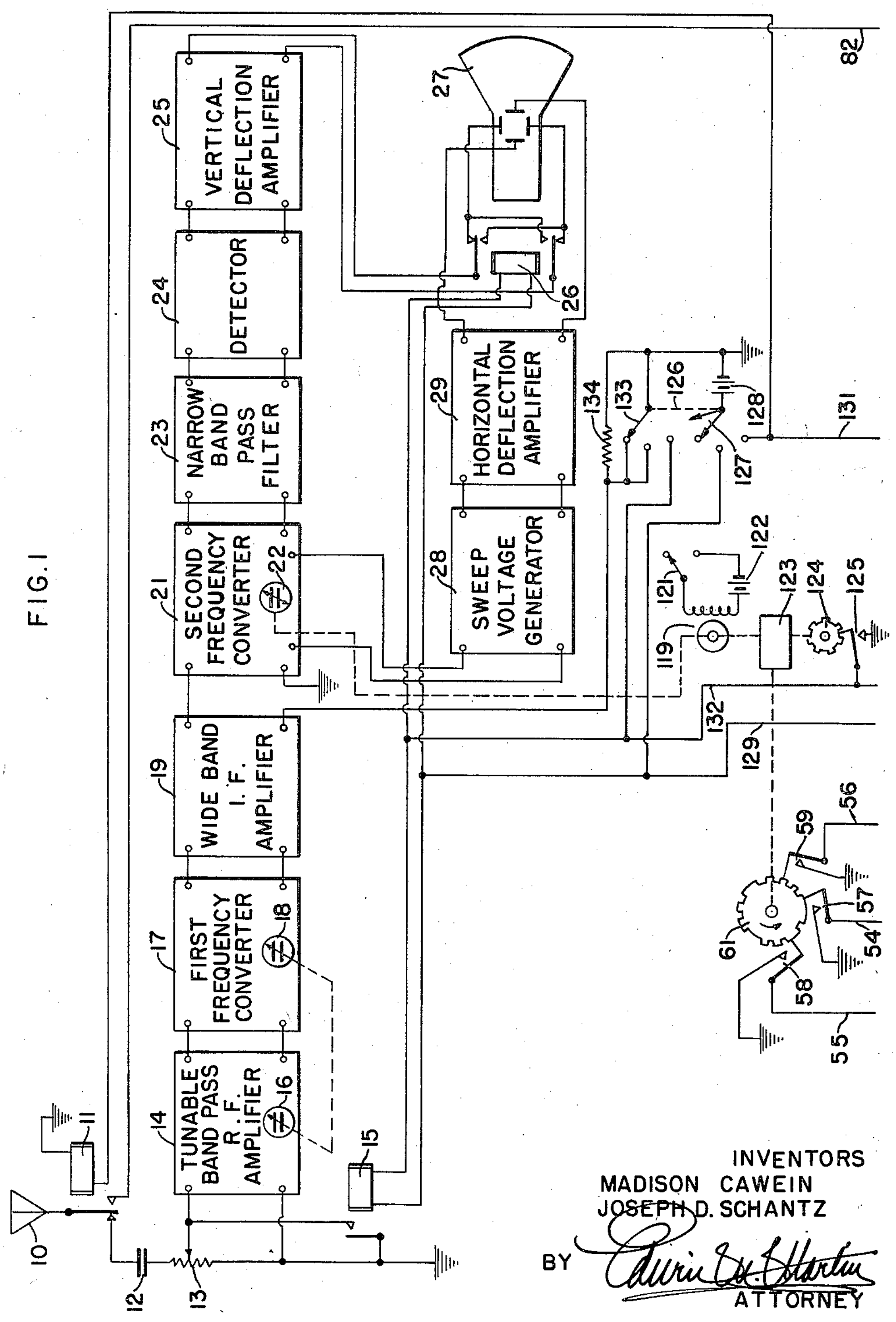
Fig. 1 illustrates, in block diagram form, a panoramic radio receiver together with some of the control apparatus for the transmitter.
Figure 2:
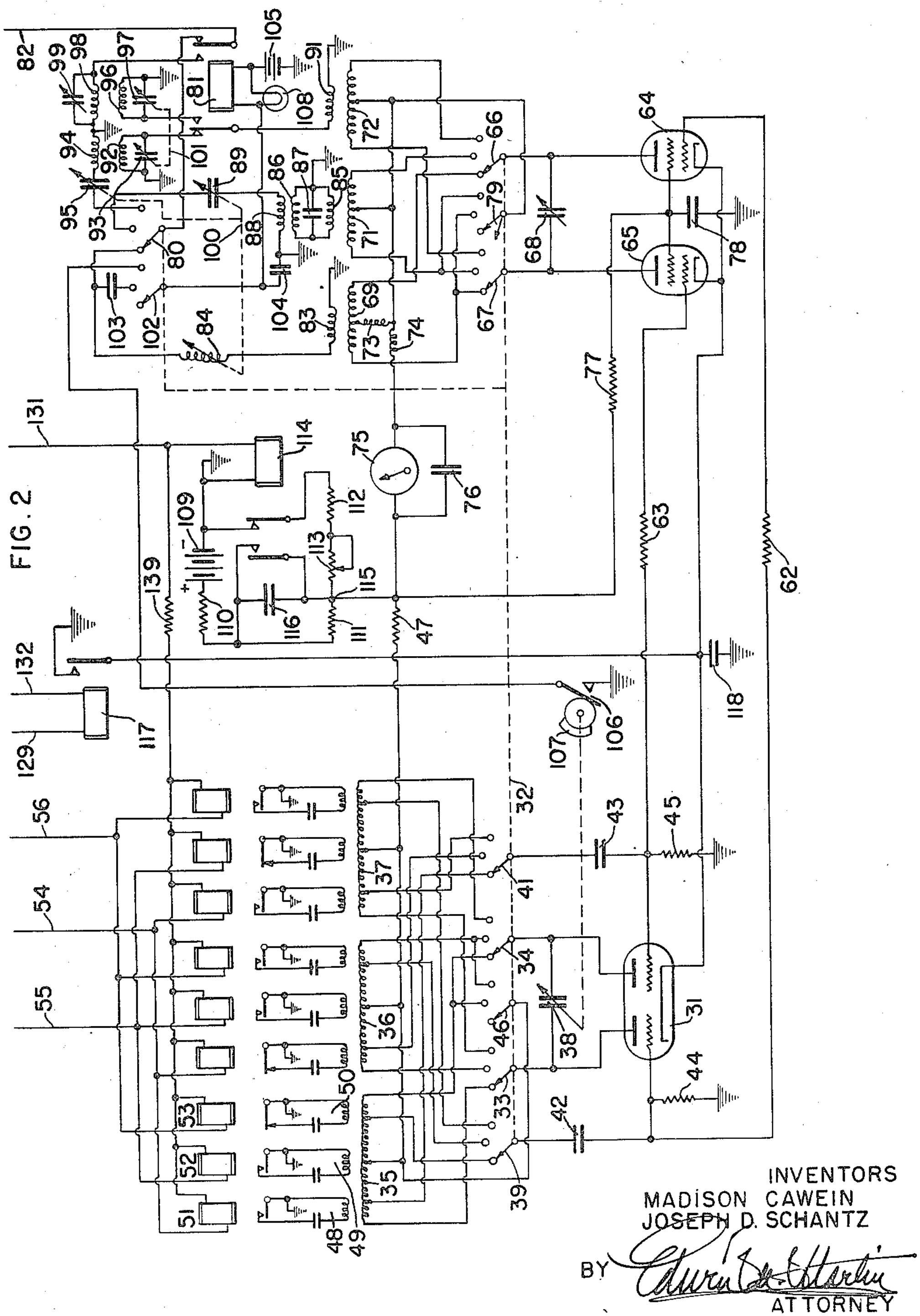
Fig. 2 is a schematic diagram of an interference transmitter embodying the instant invention.

Referring now more particularly to Figs. 1 and 2 of the drawings, there is shown a superheterodyne radio receiver of the panoramic type and the apparatus for transmitting a frequency modulated interfering carrier wave. There is provided an antenna 10 for use both by the receiver and the transmitter. The antenna is connected to the armature of an antenna change-over relay 11. With this relay in its unoperated position, the antenna is connected through the break contact thereof to the receiver. When the relay is operated, the antenna is connected through the make contact thereof to the transmitter.

The connection of the antenna to the receiver is made through a condenser 12 and a resistance 13. The signals impressed upon the input circuit of the receiver are derived from the resistance 13 which is connected to a tunable band pass radio frequency amplifier 14. The input circuit is arranged to be short-circuited at times by the operation of the make contact of an antenna short-circuiting relay 15. Tuning of the amplifier is effected by a variable condenser 16. This amplifier is designed to amplify simultaneously a plurality of radio frequency signals within a predetermined band. The particular band of frequencies is selected by tuning the amplifier.

The amplified band of radio frequency signals is converted into a predetermined band of intermediate frequency signals by means of a first frequency converter 17. The oscillator portion of the frequency converter is tuned by a variable condenser 18. The variable condensers 16 and 18 are mechanically connected so that, as the frequencies of the band of radio frequency signals are varied, corresponding variations are made in the frequency of the oscillator of the first frequency converter. By this means all received signals, irrespective of the frequencies thereof, are converted to the same predetermined band of first intermediate frequencies.

The band of intermediate frequencies is amplified by a wide band intermediate frequency amplifier 19. These amplified first intermediate frequency signals then are converted successively, by a second frequency converter 21, to a single predetermined second intermediate frequency. The successive conversion of the band of frequencies is effected by periodically varying the frequency of the oscillator included in the second frequency converter 21 through a predetermined band of frequencies. The frequency variation of the second frequency converter oscillator is effected by means of a variable condenser 22, the rotor plates of which are driven by mechanism to be described.

The successive second intermediate frequency signals are conducted through a narrow band pass filter 23, the parameters of which are adjusted to permit the conduction of only the second intermediate frequency. The signals then are rectified or demodulated by a detector 24 and amplified by a vertical deflection amplifier 25. The series of amplified signals then are conducted through the armatures and break contacts of a plate-reversing relay 26 to the vertical deflector plates of a cathode ray tube 27.

The cyclically varying frequencies generated by the second frequency converter also are applied to a sweep voltage generator 28 by means of which they are converted into a unidirectional voltage of saw-tooth wave form. Examples of such a generator are disclosed in the co-pending application of Robert W. Sanders, Serial No. 475,861, filed February 15, 1943, now Patent No. 2,387,685 granted October 23, 1945, and entitled "Voltage Generator," and the co-pending application of Madison Cawein, Serial No. 471,854, filed January 9, 1943, now Patent No. 2,467,465 granted April 19, 1949, and entitled "Voltage Generator." The saw-tooth wave thus generated is amplified by a horizontal deflection amplifier 29 and applied to the horizontal plates of the cathode ray tube 27.

The transmitter, as shown in Fig. 2, includes an oscillator provided with a vacuum tube 31 having a cathode, a pair of grids and a pair of anodes. This tube may be an RK—34 type or its equivalent. Associated with the anodes of the tube is a plurality of frequency-determining circuits each including an inductance and a variable condenser. The oscillator, as disclosed herein, is designed to operate in any one of three bands of frequencies. For each of the three bands there is provided an inductance. A variable condenser may be connected in parallel with any one of the three inductances. The particular inductance used in the frequency-determining circuit of the oscillator is selected by two blades of a ten-bladed, three-position band switch 32. All ten blades of the switch are mechanically, but not electrically, connected for simultaneous operation. For illustrative purposes, the transmitter is shown arranged for operation in any one of three frequency bands and consequently three inductances are used with the oscillator for frequency-determining purposes.

The anodes of the tube 31 are connected to switch blades 33 and 34 which in turn are engageable with any one of their three respective contacts. For example, with the switch 32 in the position shown, the anodes of the tube 31 are connected through the left-hand contacts associated with blades 33 and 34 to the terminals of an inductance 35 for operation in band I. With the switch blades 33 and 34 engaged with the center contacts, the anodes of the tube are connected to the terminals of an inductance 36 for operation in band II. Similarly, when the switch blades are engaged with their right-hand contacts, the anodes of the tube are connected to the terminals of an inductance 37 for operation in band III. Tuning of any one of the three inductances is effected by a variable condenser 38 connected between the anodes of the tube 31.

Each of the inductances is provided with intermediate taps which, in the case of the inductance 35, for example, are connected to the left-hand contacts associated with the band switch blades 39 and 41. In a similar manner, intermediate taps of the inductances 36 and 37 are connected respectively to the center and right-hand contacts associated with these switch blades. These switch blades are connected respectively through coupling condensers 42 and 43 to the grids of the tube 31. This arrangement provides the coupling between the output and the input circuits of the oscillator tube 31. The grids of the tube are also connected through leak resistances 44 and 45 to ground.

The midpoints of the inductances 35, 36 and 37 are connected to a switch blade 46. The center contact associated with this switch blade is connected to one of the terminals of inductance 35 and the right-hand contact is connected to a terminal of the inductance 36. The purpose of this arrangement is to short-circuit the unused lower frequency inductances when the immediately higher frequency inductance is in use so that undesired self-resonant oscillations are prevented in the unused inductances. The mid-points of these inductances are also connected through a resistance 47 to a source of positive potential.

There are provided with each of the oscillator frequency-determining inductances 35, 36 and 37, three frequency-shifting circuits. For example, there are associated with inductances 35, frequency-shifting circuits 48, 49 and 50. Each of these circuits comprises a series connection of a condenser and an inductance. Apparatus is provided for closing the frequency-shifting circuits singly or in any of the possible combinations thereof so as to shift the oscillator frequency abruptly in varying amounts determined by the constants of the frequency-shifting circuits. The circuits 48, 49 and 50 are controlled respectively by the contacts of relays 51, 52 and 53. Each of the other oscillator frequency-determining inductances is provided with a similar group of frequency-shifting circuits.

The windings of the control relays 51, 52 and 53 are connected respectively by conductors 54, 55 and 56 to contacts 57, 58 and 59 (Fig. 1). The operation of these contacts is controlled by a code wheel 61 having a notched periphery and adapted to be continuously rotated by mechanism to be described. The configuration of the code wheel periphery and the angular disposition of the contacts 57, 58 and 59 relative to one another, determines the timing of the operation of the frequency-shifting relays 51, 52 and 53.

The output circuit of the transmitter oscillator including the tube 31, is coupled by condensers 42 and 43 through small isolating resistances 62 and 63 respectively, to the respective control grids of a pair of power amplifier tubes 64 and 65. Each of these tubes may be a 1625 tube or an equivalent beam power tube. The output circuit of the power amplifier includes connections from the anodes of the tubes 64 and 65 to blades 66 and 67 of the band switch 32.

Connected in the output circuit of the power amplifier are three tank circuits all of which include a variable condenser 68 and each of which includes one of the inductances 69, 71 and 72. The selection of the proper inductance for the band of frequencies in which the transmitter power amplifier is to operate is determined by the position of the band switch blades 66 and 67. For operation in band I, the switch blades are positioned as shown, to connect the anodes of the power amplifier tubes 64 and 65 to the terminals of inductance 69. In band II, the connections are made, through the center contacts associated with the switch blades, to the terminals of the inductance 71. Similarly in band III, the connections are made, through the right hand contacts of this portion of the band switch to the terminals of the inductance 72.

As an auxiliary frequency-determining element in the power amplifier tank circuit of band I there is connected to the mid-point of inductance 69, an inductance 73 which is also connected to the mid-points of inductances 71 and 72. These connections are extended through a coil 74 and a current indicating device such as a milliammeter 75 to a source of positive potential. The milliammeter is shunted by a condenser 76. There is also provided, from the source of positive potential, a connection through a resistance 77 to the screen grids of the power amplifier tubes 64 and 65 which are also connected through a by-pass condenser 78 to ground.

A double switch blade 79 of the band switch 32 is connected to the mid-point of the power amplifier tank circuit inductances 69, 71 and 72. This blade is arranged to engage simultaneously any two adjacent ones of the contacts associated therewith. There is provided, from the center one of these contacts, a connection to one terminal of inductance 69. Another connection is made between the right hand contact and the corresponding terminal of the inductance 71. The purpose of these connections is to short-circuit either the inductance 69 or the inductances 69 and 71 when operation of the amplifier is a band of frequencies higher than those employing the lower frequency inductances 69 and 71.

Inductively coupled to each of the power amplifier tank circuit inductances 69, 71 and 72 are individual link coils together with circuit elements for applying the proper loadng to the power amplifier output circuit. Connections are made from the various link coils and loading elements to the make contact of the antenna changeover relay 11. The particular connection which is made is determined by the position of the band switch blade 80. This blade is connected through the right-hand break contact of a coupling change-over relay 81, and over conductor 82 to the make contact of the antenna change-over relay 11.

A link coil 83, which is coupled to the tank circuit inductance 69, is connected to ground and also through a variable loading coil, such as a variometer 84, to the left-hand contact associated with the switch blade 80.

There is coupled to the tank circuit inductance 71, a fixed tuned link circuit comprising the parallel connection of inductances 85 and 86 and a condenser 87. This link circuit is connected to ground and, in order to match the antenna properly, is designed to provide a coupling between the power amplifier output circuit and the antenna which is increasingly effective as the operating frequency is increased. The purpose of such an arrangement is to effect the transfer to the antenna of a substantially constant amount of energy, or at least a predetermined minimum amount, at all frequencies within the band. Inductively coupled to the fixed tuned link circuit is a loading coil 88 which is connected to ground and also through a variable tuning condenser 89 to the center contact associated with the switch blade 80.

A link coil 91 is inductively coupled to the tank circuit inductance 72 and is connected to ground and through the left-hand break contact of relay 81 to a tunable link circuit comprising the grounded parallel connection of an inductance 92 and a variable tuning condenser 93. Coupled to the coil 92 is a series tuned loading circuit comprising the grounded series connection of an inductance 94 and a variable tuning condenser 95. The loading circuit is connected to the right-hand contact associated with the switch blade 80.

An alternative connection from the link coil 91 is made through the left-hand make contact of the coupling change-over relay 81, to another tunable link circuit comprising the grounded parallel connection of an inductance 96 and a variable tuning condenser 97. Both of the link circuits including the inductances 92 and 96 are tuned to provide the required effective coupling between the power amplifier output circuit and the antenna. Coupled to the inductance 96 is a parallel tuned loading circuit comprising the grounded parallel connection of an inductance 98 and a variable tuning condenser 99. This loading circuit is connected through the right-hand make contact of the coupling change-over relay 81 to the antenna change-over relay.

The variometer 84 and the variable condensers 89 and 95 are mechanically connected for simultaneous operation and will be referred to as the load tuning control 100. Also, the variable condensers 93 and 97 are mechanically connected and will be referred to as the link tuning control 101.

The band switch 32 is provided with another switch blade 102 which, when engaged with its center contact, short-circuits the variometer 84 to ground through a series connection of condensers 103 and 104. The purpose of this connection is to prevent the absorption of power by the variometer when the apparatus is operating in band II.

When the switch blade 102 is connected to its right-hand contact during operation of the transmitter in band III, a connection is made to one terminal of the winding of the coupling change-over relay 81. The other terminal of this winding is connected to a source of direct current such as the grounded battery 105. The connection through the switch blade 102 and its right-hand contact is extended to a contact 106 which is controlled by a cam 107. This cam is mechanically connected to the oscillator tuning condenser 36 so that the contact 106 is closed during the transmission of a predetermined group of frequencies in band III. During this time the coupling change-over relay 81 is operated to effect the coupling between the power amplifier output circuit and the antenna system through the apparatus associated with the make contacts of the relay. If desired, a signal light 108 may be connected in parallel with the winding of this relay as an indication to the operator of the particular coupling in use.

The transmitter oscillator and the power amplifier are provided with facilities for operating at either high or low power. This is achieved by changing the value of the positive potential supplied to the various circuits described hereinbefore. A source of direct current such as a battery 109 is arranged with its negative terminal grounded and its positive terminal connected through a resistance 110 to one terminal of a voltage divider comprising a series arrangement of fixed resistances 111 and 112 and a potentiometer 113. The other terminal of the voltage divider is connected to ground through a break contact of a power change relay 114. The various circuits to be supplied with the positive direct current potential are connected to a point 115 on the voltage divider. When the power change relay 114 is operated to disconnect the voltage divider, the point 115 is connected through a make contact of the relay to the resistance 110. The make contact is shunted by a condenser 116 to prevent deterioration of the contacts by arcing.

The transmitter oscillator and the power amplifier are switched into and out of operation by means including a connection from the cathodes of the oscillator tube 31 and of the power amplifier tubes 64 and 65 to a make contact of a cathode keying relay 117. The cathodes of these tubes are also by-passed to ground through a condenser 118. When the relay 117 is operated the cathodes are connected to ground, thereby rendering the oscillator and the power amplifier operative.

The apparatus is provided with a motor 119 (Fig. 1) which is arranged to be connected by a switch 121 to a source of power 122. Directly connected mechanically to the rotor of the motor 119 is the variable condenser 22 of the oscillator portion of the second frequency converter 21. The rotor is also connected through gearing 123 to the code wheel 61. The motor 119 also serves to drive, through the gearing 123, a circuit controlling device such as a notched disk 124. This disk alternatively makes and breaks a contact 125 to control the operation of the antenna short-circuiting relay 15, the plate-reversing relay 26 and the cathode keying relay 117 under certain conditions to be described.

The apparatus is also provided with a two-bladed three-position operational switch 126. The double blade 127 is arranged to engage simultaneously any two adjacent ones of the contacts associated therewith. This double blade is connected to a grounded source of energy such as a battery 128. With the double blade in its upper position, as shown, no connections are made to the battery 128. In its center position the battery 128 is applied to conductor 129 which is connected to one terminal of each of the windings of relays 15, 26 and 117. When the double blade is in its lower position the battery is connected also to the winding of the antenna change-over relay 11 and over conductor 131, to the winding of the power change relay 114 to effect the operation of these relays. Also the battery connection to conductor 131 prepares the frequency-shifting relays such as 51, 52 and 53 for operation under the control of the code wheel contacts 57, 58 and 59 respectively. While the blades of the operational switch 126 are in their center positions the relays 15, 26 and 117 are operated intermittently under the control of the contact 125 which, when closed, grounds a conductor 132, which is connected to the other terminal of each of the windings of relays 15, 26 and 117.

The operational switch blade 133 is connected to ground and, by means of the upper and center contacts associated therewith, short-circuits a resistance 134 connected in the output circuit of the wide band first intermediate frequency amplifier 19. When this blade is engaged with its lower contact the short circuit is removed and ground is permanently connected to the control circuits for relays 15, 26 and 117.

Referring now to the operation of the system, the general procedure will be outlined first. The operator first must explore a portion of the frequency spectrum to ascertain the communications transmitted therein. The individual signals then must be examined to determine which are those of the enemy. In order to hamper enemy operations the operator then selects an enemy signal which he desires to mutilate by the transmission of an interfering carrier wave.

With power supplied to the receiver and transmitter, the motor power switch 121 closed and the operational switch 126 in its upper or "spot" position, the receiver is tuned by means of condensers 16 and 18 to produce indications on the screen of the cathode ray tube 27 of all signal frequencies within a selected band. It is assumed that the motor 119 drives the tuning condenser 22 of the second frequency converter oscillator at 30 R. P. S. Consequently, vertical traces corresponding to the signalling frequencies within the received band are produced repeatedly upon the screen at the rate of 30 per second.

Figures 3, 4, 5:
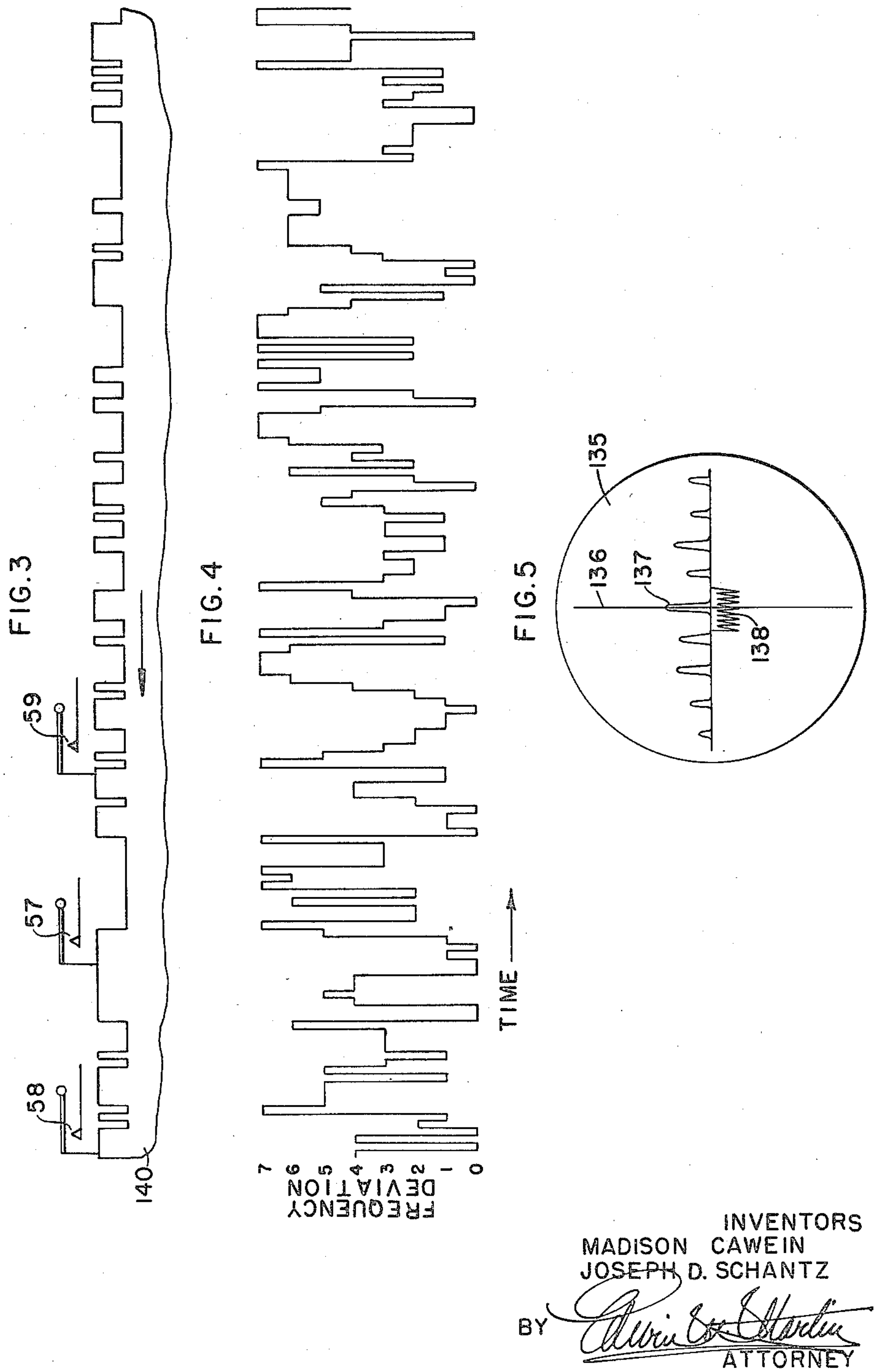
Fig. 3 is a developed view of the periphery of a code wheel for controlling the frequency modulation of the transmitted carrier wave.
Fig. 4 is a graph illustrating a typical frequency modulation of the transmitter carrier wave.
Fig. 5 is a view of the screen of the visual indicating device used with the receiving and transmitting apparatus and shows a typical indication of the received and transmitted carrier wave frequencies.

A typical view of the cathode ray tube screen is illustrated in Fig. 5. The screen 135 is provided with a vertical index line 136 disposed at the center thereof. The vertical traces upon the fluorescent surface of the screen which extends upward represent the signalling frequencies within the received band. The receiver is tuned to bring the trace representing the enemy signal selected for mutilation to the center of the screen in registry with the index line 136. Such a trace is illustrated at 137.

If desired, the viewing screen of the cathode ray tube may be provided with a frequency scale as an aid in determining the frequency of the selected enemy signal; or reference may be had for this purpose to the dial setting of the receiver tuning device. The transmitter band switch 32 is set for the band including the carrier frequency of the selected signal and the tuning condenser 38 is adjusted to approximately correspond to the receiver tuning condenser 16.

The operational switch 126 is moved to its center or "aim" position effecting the engagement of the double blade 127 with its center contact. The battery 128 is connected to prepare relays 15, 26 and 117 for operation. These relays are operated intermittently under the control of the contact 125 which may be assumed to be operated at the rate of 15 R. P. S. Each operation of relay 117 effects the operation of the transmitter oscillator and the power amplifier. The energy output of the transmitter is at a low power level since the power change relay 114 is not operated, thereby connecting a reduced positive direct current potential to the oscillator and power amplifier apparatus.

Simultaneously with the operation of relay 117, the antenna short-circuiting relay 15 is operated to short circuit the input circuit of the receiver. However, since the receiver and transmitter apparatus are preferably located in proximity to one another, there is sufficient pickup of the transmitted carrier wave by the input circuit of the first frequency converter 17 to operate the intermediate frequency and signal frequency amplifiers. Thus, the interfering carrier wave is applied to the armatures of the plate reversing relay 26.

However, this relay is also operated at this time so that the signals are applied to the vertical plates of the cathode ray tube in opposite polarity to the signals derived from the receiver. This arrangement produces a single trace upon the screen 135 of the tube in a downward direction.

At this time none of the frequency-shifting relays such as 51, 52 and 53 is operating even though the contacts 57, 58 and 59 are being operated by the rotation of code disk 61 for the reason that they are not connected to a source of power. However, one of the three frequency-shifting relays in each of the three groups controls its associated frequency-shifting circuit by means of a break contact. Such an arrangement is shown for relay 53 which effects the closure of the frequency-shifting circuit 50. In the illustrated form of the invention, one of the frequency shifting circuits, such as 48, is designed to shift the oscillator frequency by 1 kilocycle. Another one of the frequency-shifting circuits, such as 49, is designed to shift the oscillator frequency by 2 kilocycles. The third frequency-shifting circuit, such as 50, is designed to shift the oscillator frequency by 4 kilocycles. With this arrangement it is seen that by operating these circuits in all of the possible combinations thereof, the oscillator frequency may be shifted from 0 to 7 kilocycles. In each band, the circuit, such as 50 for band I, which produces a 4 kilocycle shift of the oscillator frequency is controlled by a break contact on its associated relay. The other two circuits, such as 48 and 49, are controlled by make contacts on their respective associated relays. Thus, with none of the frequency-shifting relays operated, a frequency-shifting circuit, such as 50, is operative to produce a 4 kilocycle shift of the oscillator frequency.

Consequently, when the oscillator tuning condenser 38 is adjusted to approximately correspond with the setting of the receiver tuning condensers 16 and 18, there is produced upon the screen 135 of the cathode ray tube a single downward trace such as 138 representing the oscillator frequency. This frequency is the sum of the frequency determined by the setting of the tuning condenser 38 plus 4 kilocycles, the shift produced by the circuit 50. The oscillator tuning condenser 38 and the power amplifier tank circuit tuning condenser 68 are adjusted to bring the downward trace 138 into registry with the vertical index line 136 upon the screen of the cathode ray tube. This is an indication that the frequency of the generated interfering carrier wave is the same as the carrier wave frequency of the enemy signal.

The operational switch 126 is then moved to its lower or "fire" position. The switch blade 133 removes the short circuit from the resistance 134, thereby reducing the sensitivity of the intermediate and signal frequency amplifiers of the receiver. The engagement of this switch blade with its lower contact connects ground to conductor 132, thereby holding relays 15, 26 and 117 operated.

The engagement of the double blade 127 of this switch with its center and lower contacts maintains the connection of the battery 128 to conductor 129, thereby continuing the supply of power to conductor 129 and the relays associated therewith. In addition, the battery is connected to the antenna change-over relay 11 and the power change relay 114, thereby operating these relays.

Through the make contact of the antenna change-over relay, the antenna 10 is connected to the output circuit of the power amplifier included in the transmitting apparatus. The operation of the power change relay increases the positive direct current potential connected to the oscillator and power amplifier apparatus, thereby effecting the operation thereof at high power. The high power carrier wave generated by the transmitter is thus radiated by the antenna. At this same time the intermediate and signal amplifiers of the receiver, operating at reduced sensitivity, serve to produce indications of the transmitted carrier wave upon the screen of the cathode ray tube.

The engagement of the double blade 127 of the operational switch 126 with its lower contact also connects the battery 128 over conductor 131 and through a resistance 139 to the frequency-shifting relays such as 51, 52 and 53. These relays are then operated under the control of the code wheel contacts 57, 58 and 59 to modulate the transmitting carrier wave in frequency in abrupt steps of from 0 to 7 kilocycles at a substantially syllabic speech rate. The particular modulation is determined by the configuration of the periphery of the code wheel 61 and the angular positions of the control contacts with respect to one another. As viewed upon the screen 135 of the cathode ray tube, the frequency-modulated transmitted carrier wave produces a closely spaced series of eight downward traces centering around and similar to the trace 138. Such an indication is illustrated in Fig. 5. It is seen that the transmitted carrier wave frequency is shifted to either side of the frequency of the enemy carrier wave to be mutilated to a degree sufficient to completely cover a narrow band of the frequency spectrum which includes the signalling radio frequency.

Fig. 3 illustrates a development of the periphery 140 of a typical code wheel with the contacts 57, 58 and 59 arranged about the code wheel as indicated. The frequency-shifting relays are connected to the contacts as shown in Fig. 2. The frequency deviation of the transmitted carrier wave during one complete revolution of the code wheel when operating in band I, is shown by the graph of Fig. 4. It is seen that there is transmitted an abruptly frequency-modulated wave, or to distinguish from the term "frequency-modulated" as more commonly used, the transmission may be called a "step continuous wave." In operation, it has been found that, with a code wheel formed in accordance with Fig. 3, an interfering carrier wave can be generated to completely obliterate all intelligence signals on a selected communication channel when the code wheel is operated at a speed of approximately 1 R. P. M.

In considering the detailed operation of the system under the various conditions which will be met in practice it is assumed that the transmitter is designed to function in the following three frequency bands:

Band I includes the frequencies from 2.0 to 4.3 megacycles;
Band II includes the frequencies from 4.25 to 9.25 megacycles; and
Band III includes the frequencies from 9.1 to 20.0 megacycles.

In practice it may be desirable to use a receiver provided with circuits for operation in substantially the same frequency bands. In such a case a receiver band switch may be provided and, for convenience, may be mechanically connected for simultaneous operation with the transmitter band switch. In actual service, there preferably will be provided for each particular installation of this apparatus, an individual set of calibration curves, a table or similar predetermined data. Reference to such data will enable the operator, once having determined the carrier wave frequency of the enemy signal, to set quickly and accurately, the various transmitter controls for the generation of an interfering carrier wave of the desired frequency. For the sake of completeness of this disclosure, however, there will be described in detail the various manipulations of the transmitter controls which would be necessary in the absence of predetermined reference data or in the preparation of such data. In this way it is believed that a better understanding of the operation of the illustrative embodiment of the invention may be obtained.

The operational switch 126 is placed in its upper or "spot" position and the band switch is positioned to select the desired frequency band.

The operation of the apparatus in band I and band II differs somewhat from the operation in band III. Consequently, it is further assumed that the band switch is positioned for operation in band I. The receiver is tuned by means of the variable condensers 16 and 18 to bring the trace of the enemy signal into registry with the index line 136 of the cathode ray tube screen 135.

The operational switch 126 is then moved to its center or "aim" position and the oscillator tuning condenser 38 is set approximately to correspond with the settings of the receiver tuning condensers 16 and 18. The power amplifier tuning condenser 68 is adjusted to produce a maximum amplitude downward trace 138 on the cathode ray tube screen. In making this adjustment it may be necessary to readjust the oscillator tuning condenser at the same time in order to bring the trace 138 into view on the screen.

Having produced a maximum peak of the trace 138, the oscillator tuning condenser 38 is further adjusted to bring this trace into registry with the index line 136. In making this adjustment it may be necessary to readjust the power amplifier tuning condenser 68 slightly in order to maintain the trace at its maximum amplitude.

The power amplifier tuning condenser is then very carefully adjusted to produce a maximum side-to-side excursion or movement of the trace 138 on the viewing screen 135. In a special case which will be considered subsequently, this latter adjustment may be the same as the preceding adjustment of this condenser which is for the purpose of obtaining the maximum amplitude of the trace 138. It then may be necessary to trim the oscillator tuning condenser 38 slightly to bring the trace 138 exactly into registry with the index line 136.

The reason for performing the foregoing operational steps will be apparent when it is considered that there is a coupling between the oscillator frequency-determining circuit and the power amplifier output tank circuit. This coupling is effected by means of the internal grid-to-plate capacitances of the power amplifier tubes 64 and 65. The coupling is completed by the parallel connections of the power amplifier grids to the grids of the oscillator tube 31 through the small isolating resistances 62 and 63.

When the oscillator tuning first is adjusted to bring the transmitted interference trace to the index line of the viewing screen, the power amplifier output tank circuit may be tuned so as to represent either a capacitative or an inductive reactance. The particular type of reactance depends upon the preceding tuning of the tank circuit and upon whether the oscillator tuning control is adjusted for an increase or a decrease of the generated frequency in order to bring the interference trace to the index line. When the power amplifier tank circuit later is adjusted to resonance, the amplitude of the interference trace not only increases but the reactance of the tank circuit, which is reflected into the oscillator frequency-determining circuit, becomes a minimum. This condition produces an apparent frequency shift in the carrier wave generated by the transmitter. Whether the shift is to increase or to decrease the frequency depends upon the capacitative or inductive character of the power amplifier tank circuit reactance before being adjusted to resonance. The frequency shift thus produced effects the described excursions or movement of the trace 138 upon the viewing screen 135 of the cathode ray tube.

The special case referred to previously, in which there is produced no frequency shift, is that in which the power amplifier tank circuit happens to be tuned correctly for resonance at the frequency for which the oscillator tuning adjustment is made.

The operational switch 126 is then moved to its lower or "fire" position. It is obvious that, in order to make the proper final adjustment of the power amplifier tuning condenser 68, there must be a negligible loading of the tank circuit by the antenna. After the antenna 10 is connected through the antenna change-over relay 11 to the power amplifier output circuit upon the movement of the operational switch 126 to the "fire" position, the power amplifier tuning condenser 68 is given a final adjustment which is made in cooperation with an adjustment of the load tuning control 100. When operating in band I, as assumed, this latter control is effective to vary the inductance of the variometer 84. These two adjustments are made to produce a minimum plate current of the power amplifier as indicated by the milliammeter 75. The adjustment for the production of the minimum plate current indicates that the power amplifier tank circuit is properly adjusted for resonance at the frequency of the interfering carrier wave generated by the transmitter.

The load tuning control 100 is then readjusted to produce a maximum plate current indicating that the interfering carrier wave is being radiated from the antenna at maximum power. In some cases it may be necessary to make a slight adjustment in the oscillator tuning condenser 38 in order to bring the center of the group of transmitted step continuous wave traces into registry with the index line 136 of the viewing screen.

If operation of the apparatus is in band II, the band switch 32 is placed in the position to effect the engagement of the blades with their associated center contacts. The other adjustments of the apparatus are the same as those described for operation in band I.

If operation is in band III, the band switch 32 is positioned to effect the engagement of its blades with their right-hand contacts. The link tuning control 101 is then adjusted to its proper setting for the frequency of the carrier wave to be interfered with. This setting, preferably, is determined from a calibration curve, one of which should be prepared in advance of the operation of the apparatus for the particular antenna used. As long as the adjustment of the oscillator tuning control 38 does not effect the closure of the cam control contact 106, the adjustments of the apparatus are identical to the adjustments described in connection with the operation in band I.

The cam 107 is so shaped and positioned with respect to the oscillator tuning condenser 38 that the contact 106 is closed when the transmitter is adjusted for operation between the frequencies of 10.5 and 15.2 megacycles. When operation is within this range of frequencies the coupling change-over relay 81 is operated and the link tuning light 108 is illuminated. In this case, when it is desired to make the final adjustment of the power amplifier tank circuit tuning with negligible loading of this circuit by the antenna, the adjustment of the load tuning control 100 to produce minimum plate current is omitted. It is seen that this control is inoperative at this time.

It is necessary to tune the two link circuits used when operating in band III because of the wide variation of the antenna impedance when operated at the large number of frequencies in this band. This tuning adjusts the effective coupling between the power amplifier output circuit and the antenna to the proper amount at any frequency, by effecting a variation in the resonant frequency of the link circuit. Hence, the impedance of this circuit is varied according to the operating frequency.

At frequencies below 18 megacycles, the link circuit is tuned sufficiently above the operating frequency to produce the necessary effective coupling by the use of less than the resonant value of capacity. At frequencies above 18 megacycles, the link is tuned below the operating frequency by using more than the resonant value of capacity. When the operating frequency is near 18 megacycles, there ordinarily will be required no tuning of the link circuit unless the antenna used is substantially different from the design data of the transmitter.

Excessive loading of the plate tank circuit may be reduced by an adjustment of the variable condenser 99 used to tune the loading coil 98. The proper adjustment of this condenser is one in which the maximum possible capacity thereof is used which does not produce excessive loading at any frequency in the range between 10.5 and 15.2 megacycles. The purpose of making this adjustment is to produce resonance of the loading coil 98 at a frequency which is sufficiently higher than the resonant frequency of the antenna so that, when the frequency of the interfering carrier wave is increased to the point where resonance of coil 98 is produced, the impedance of the antenna will have decreased to a value low enough to prevent excessive tank circuit loading.

It will be noted that the grids of the oscillator tube 31 and the control grids of the power amplifier tubes 64 and 65 are connected in parallel, being isolated by only the small resistances 62 and 63. This arrangement greatly simplifies the switching required between the various frequency bands. Such an arrangement is made possible because of the fact that the oscillator tube 31 is of a type which has a small amplification factor, while the power amplifier tubes are of the beam power type, having large amplification factors.

In the design of the transmitter oscillator and power amplifier apparatus, the oscillator frequency-determining inductances 35, 36 and 37 are made as nearly identical to the power amplifier tank circuit inductances 69, 71 and 72 as practical. Similarly, the tuning condensers 38 and 68 for the oscillator and power amplifier output circuits respectively, have the same capacitance curves. By reason of this duplication of circuit constants, there is secured excellent tracking of the condensers 38 and 68 over most of the frequency range. If desired, small trimmer condensers may be provided with the various inductances to adjust the tracking of the tuning condensers at the high frequency end of each band. Since such an arrangement is conventional the drawings have not been complicated by a detailed showing of this facility.

In some cases the operation of the apparatus may be expediated somewhat by omitting the "aiming" operation. After identifying the enemy signal to be mutilated and bringing the representative trace thereof into registry with the index line of the cathode ray tube screen, the operational switch 126 may be moved immediately from its upper to its lower position. The transmitter oscillator and power amplifier adjustments may be made in the manner described, using the index line of the viewing screen as a reference point instead of aligning the trace representing the transmitter carrier wave with the trace representing the carrier wave selected for multilation.

Having adjusted the transmitter oscillator and power amplifier circuits for the transmission of th interfering carrier wave, it is well to move the operational switch 126 to its upper or "spot" position occasionally for momentary periods to determine whether or not the enemy signal still is being transmitted. If it is, then the operational switch should be immediately returned to its lower or "fire" position for a resumption of the transmission of the interfering carrier wave.

It is evident that the method of disrupting any desired radio communication by the transmission of a carrier wave which is abruptly modulated in frequency, and the apparatus for carrying out this method are highly effective for such a purpose. The enemy signal may be quickly located and identified by the panoramic receiver. Then, having made the necessary preliminary calibrations for the particular antenna to be used, it is a relatively simple and quick matter to adjust the transmitter and the power amplifier to the frequency of the enemy signal. Once the interfering carrier wave is transmitted, the step continuous wave character thereof mutilates the enemy signal so completely that it is virtually impossible to receive and translate it into intelligible form. Furthermore, by the proper selection of the particular character of the modulation, the mutilated signal, which is received by the enemy, may be made to resemble a translatable communication but actually is not, thereby adding to the confusion of the enemy.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a system for interfering with radio communications, a radio receiver including a visual indicating device, means for tuning said receiver to produce an indication corresponding to the frequency of the carrier wave of a selected signal, a radio transmitter including a variable frequency oscillator, means including said indicating device for adjusting the frequency of said oscillator to the carrier frequency of the selected signal, and means for radiating the carrier wave generated by said oscillator to interfere with the carrier wave of the selected signal.

2. In a system for interfering with radio communications, a radio receiver including a cathode ray tube having a viewing screen, an antenna circuit normally connected to said receiver, means for tuning said receiver to produce a trace on said screen representing the frequency of the carrier wave of a selected signal, a radio transmitter including a variable frequency oscillator, means for adjusting the frequency of said oscillator to produce a second trace on said screen in registry with said receiver-produced trace, and means for switching said antenna circuit from the receiver to the transmitter, whereby the carrier wave generated by said oscillator is radiated to interfere with the carrier wave of the selected signal.

3. In a radio system, an antenna, a transmitter, a receiver adapted to receive signals derived from said antenna or from said transmitter, a cathode ray tube having a viewing screen and deflecting elements, said deflecting elements being connected to said receiver, means operable to reverse the connections of said receiver to said deflecting elements, means operable to effect the operation of said transmitter, means operable to short-circuit said antenna, means for tuning said receiver to produce an antenna-derived trace on said screen, means operable to effect the intermittent operation of said reversing means, said short-circuiting means and said transmitter-operating means, and means for adjusting the frequency of the carrier wave generated by said transmitter to produce a transmitter-derived trace on said screen during the periods of operation of said reversing means, said short-circuiting means and said transmitter-operating means, the transmitter frequency being adjusted to bring said antenna-derived and said transmitter-derived traces into registry on said screen.

4. In a radio system, an antenna to intercept carrier waves of different frequencies, a transmitter tuned to generate a carrier wave of a selected one of said frequencies, an amplifier connected to amplify signals derived from said antenna or from said transmitter, a cathode ray tube having a viewing screen and deflecting elements, said deflecting elements being connected to said amplifier, a reversing relay to reverse said amplifier connections to said deflecting elements, a keying relay for effecting operation of said transmitter, a short-circuiting relay for short-circuiting said antenna, means for tuning said amplifier for response to a signal having a carrier wave of said selected frequency, means operable to effect the intermittent operation of said reversing relay, said short-circuiting relay and said keying relay, whereby to produce aligned indications of the carrier wave of said selected frequency intercepted by said antenna and of the carrier wave generated by said transmitter.

5. In a radio system, an antenna, a transmitter, a receiver adapted to receive signals derived from said antenna or from said transmitter, a cathode ray tube having a viewing screen and deflecting elements, a reversing relay having controlled circuits connected to said receiver and to a pair of said deflector elements, said circuits being arranged to reverse the connection between said receiver and said deflecting elements, a keying relay for effecting operation of said transmitter, a short-circuiting relay for short-circuiting said receiver to signals intercepted by said antenna, means for tuning said receiver to produce a received signal trace on said screen representing the carrier wave frequency of a selected signal, a contacting device operable to effect the intermittent operation of said reversing relay said short-circuiting relay and said keying relay, and means for adjusting the frequency of the carrier wave generated by said transmitter to produce a transmitted signal trace on said screen during the periods of operation of said relays, the transmitter frequency being adjusted to bring said received and said transmitted signal traces into registry on said screen.

6. In a system for interfering with a radio communication, a carrier wave transmitter including an oscillator, a frequency-determining circuit for said oscillator to effect the generation by said oscillator of a carrier wave having a frequency corresponding to the frequency of the carrier wave of said communication, and means including a plurality of frequency-shifting circuits coupled to said frequency-determining circuit to shift said oscillator frequency in a random manner to effect the transmission of a constant amplitude carrier wave frequency-modulated according to a predetermined unintelligible code.

7. In a system for interfering with a radio communication, a carrier wave transmitter including a variable frequency oscillator, a frequency-determining circuit for said oscillator, means for adjusting said frequency-determining circuit to effect the generation by said oscillator of a carrier wave having a frequency corresponding to the frequency of the carrier wave of said communication, and means including a plurality of frequency-shifting circuits coupled to said frequency-determining circuit to produce shifts of said oscillator frequency of predetermined amounts and in predetermined senses in a random manner to effect the transmission of a constant amplitude carrier wave frequency-modulated according to a predetermined unintelligible code.

8. In a system for interfering with a radio communication, a carrier wave transmitter including a variable frequency oscillator, a plurality of frequency-determining circuits for said oscillator, means for selecting one of said frequency-determining circuits to effect the generation by said oscillator of frequencies in one of a plurality of bands of frequencies, means for adjusting the selected frequency-determining circuit to effect the generation by said oscillator of a carrier wave having a frequency corresponding to the frequency of the carrier wave of said communication, a plurality of frequency-shifting circuits for each of said frequency-determining circuits, each of said frequency-shifting circuits being coupled to its associated frequency-determining circuit and arranged, when operative, to produce a shift of said oscillator frequency of a predetermined amount and in a predetermined sense, and means for operating said frequency-shifting circuits in a random manner to effect the transmission of a constant amplitude carrier wave frequency-modulated according to a predetermined unintelligible code.

9. In a system for interfering with a radio communication, a carrier wave transmitter including a variable frequency oscillator, a plurality of frequency-determining circuits for said oscillator, a band switch for selecting one of said frequency-determining circuits to effect the generation by said oscillator of frequencies in one of a plurality of bands of frequencies, means for adjusting the selected frequency-determining circuit to effect the generation by said oscillator of a carrier wave having a frequency corresponding to the frequency of the carrier wave of said communication, a plurality of frequency-shifting circuits for each of said frequency-determining circuits, each of said frequency-shifting circuits being coupled to its associated frequency-determining circuit and arranged, when operative, to produce a shift of said oscillator frequency of a predetermined amount and in a predetermined sense, and a contacting device for operating said frequency-shifting circuits in a random manner to effect the transmission of a constant amplitude carrier wave frequency-modulated according to a predetermined unintelligible code.

10. The method of disrupting a radio communication which includes the steps of, determining the carrier wave frequency of said communication, and transmitting an interfering carrier wave abruptly modulated in frequency in a relatively narrow band including the carrier wave frequency of said communication and substantially at a syllabic speech rate.

11. The method of disrupting radio communications which includes the steps of, selecting one of said communications, determining the carrier wave frequency of said selected communication, and transmitting an interfering carrier wave abruptly modulated in frequency in a relatively narrow band including the carrier wave frequency of said selected communication.

12. The method of disrupting a radio communication which includes the steps of, producing a visual indication representing the carrier wave frequency of said communication, producing a second visual indication representing the frequency of an interfering carrier wave, effecting registry between said visual indications, and radiating said interfering carrier wave.

13. The method of disrupting a radio communication which includes the steps of, determining, by visual perception, the carrier wave frequency of said communication, and transmitting an interfering carrier wave by radiating a carrier wave frequency modulated in a relatively narrow band including the carrier wave frequency of said communication.

14. The method of disrupting a radio communication which includes the steps of, determining, by visual perception, the carrier wave frequency of said communication, adjusting, by visual perception, the frequency of an interfering carrier wave to correspond with the carrier wave frequency of said communication, and transmitting said interfering carrier wave by radiating a carrier wave frequency modulated in a relatively narrow band including the carrier wave frequency of said communication.

MADISON CAWEIN.
JOSEPH D. SCHANTZ.

REFERENCES CITED

The following references are of record in the file of this patent:

UNITED STATES PATENTS

| Number | Name | Date |
|---|---|---|
| 1,406,857 | Heising | Feb. 14, 1922 |
| 1,454,532 | Beatty | May 8, 1923 |
| 1,489,031 | Hammond | Apr. 1, 1924 |
| 1,607,485 | Schmidt | Nov. 16, 1926 |
| 1,610,329 | Shivers | Dec. 14, 1926 |
| 1,875,165 | Schroter | Aug. 30, 1932 |
| 2,113,419 | Young | Apr. 5, 1938 |
| 2,129,860 | Mitchell | Sept. 13, 1938 |
| 2,189,549 | Hershberger | Feb. 6, 1940 |
| 2,199,179 | Koch | Apr. 30, 1940 |
| 2,209,273 | Hills | July 23, 1940 |
| 2,273,914 | Wallace | Feb. 24, 1942 |
| 2,279,151 | Wallace | Apr. 7, 1942 |
| 2,295,629 | Bond | Sept. 15, 1942 |
| 2,297,482 | Kuhlmann | Sept. 29, 1942 |
| 2,312,203 | Wallace | Feb. 23, 1943 |
| 2,317,547 | McRae | Apr. 27, 1943 |
| 2,363,583 | Gilman | Nov. 28, 1944 |

OTHER REFERENCES

"Wireless World," editorial, May 1940, page 157.

QST, May 1939, pages 86 and 88.

"Panoramic Radio Spectroscopes," pamphlet by Panoramic Radio Corp., page 8, rec'd U. S. Patent Office, Feb. 9, 1943.